United States Patent
Myint

[19]

[11] Patent Number: 6,059,470
[45] Date of Patent: *May 9, 2000

[54] ADJUSTABLE, CURVED KEYBOARD

[76] Inventor: Soe Myint, 8 Sunset Rd., Sloatsburg, N.Y. 10974

[*] Notice: This patent is subject to a terminal disclaimer.

[21] Appl. No.: 09/162,027

[22] Filed: Sep. 28, 1998

Related U.S. Application Data

[63] Continuation of application No. 09/055,629, Apr. 6, 1998, abandoned, which is a continuation of application No. 08/626,038, Apr. 1, 1996, Pat. No. 5,735,619.

[51] Int. Cl.⁷ ........................................................ B41J 5/08
[52] U.S. Cl. .................... 400/488; 400/489; 400/491.3; 400/715
[58] Field of Search .................................. 400/472, 488, 400/489, 491.3, 715, 492

[56] References Cited

U.S. PATENT DOCUMENTS

| | | | |
|---|---|---|---|
| D. 338,665 | 8/1993 | Riley et al. | D14/115 |
| D. 348,453 | 7/1994 | Riley et al. | D14/115 |
| D. 381,017 | 7/1997 | Burrell, IV | 400/489 |
| 2,110,903 | 3/1938 | Breitling et al. | 235/145 R |
| 4,597,681 | 7/1986 | Hodges | 400/488 |
| 4,940,346 | 7/1990 | Liljenquist | 400/472 |
| 5,038,260 | 8/1991 | Scheibengraber | 362/268 |
| 5,073,050 | 12/1991 | Andrews | 400/489 |
| 5,120,938 | 6/1992 | Rollason | 235/145 R |
| 5,397,189 | 3/1995 | Minogue | 400/489 |
| 5,405,204 | 4/1995 | Ambrose | 400/472 |

*Primary Examiner*—John Hilten
*Assistant Examiner*—Leslie J. Grohusky
*Attorney, Agent, or Firm*—Ohlandt, Greeley, Ruggiero & Perle

[57] ABSTRACT

There is provided an adjustable, curved keyboard having arcuately arranged keys to complement naturally to a user's wrists, hands and fingers. The keyboard is supported by a bracket, which extends from underneath the desktop of a desk, for pivotal, elevational and horizontal adjustment of the keyboard's position relative to the user. The keyboard comprises an elongated base and alphanumeric keys positioned at an upper surface of the base. The base has a longitudinal axis disposed below the upper surface of the elongated base, and the upper surface is curved about the longitudinal axis. Also, the alphanumeric keys are arranged about the longitudinal axis of the base to form an arcuate typing surface that provides a comfortable typing surface for the user and reduces the risks of repetitive stress injury.

14 Claims, 5 Drawing Sheets

ADJUSTABLE, CURVED KEYBOARD

This is a continuation of application Ser. No. 09/055,629, filed Apr. 6, 1998, now abandoned which is a continuation of application Ser. No. 08/626,038, filed Apr. 1, 1996 (now U.S. Pat. No. 5,735,619).

BACKGROUND OF THE INVENTION

I. Field of the Invention

The present invention relates generally to ergonomically designed keyboards for computers, typewriters and the like. More particularly, the present invention relates to an adjustable, curved keyboard having arcuately arranged keys that complement naturally a user's wrists, hands and fingers. This keyboard permits the user to maintain a relaxed position which does not cause repeated stress to the user's wrists, hands and fingers.

Frequent users of standard keyboards are often afflicted with a serious, repetitive stress injury ("RSI"), such as carpal tunnel syndrome. RSI is often caused by maintaining the fingers, hands, wrists and arms in an unnatural position, i.e. bent wrists, while typing. The symptoms of RSI include tingling and numbness in the fingers which progress to aching or shooting pains and weakness in the hands and forearm. RSI, particularly carpal tunnel syndrome, is a major concern for keyboard operators and their employers since such injuries cause discomfort to the operator, lower the productivity of the operator, and often increase worker compensation claims.

Physical therapists, orthopedic surgeons and ergonomics experts have suggested that the user's posture is important for prevention of RSI, particularly carpal tunnel syndrome. In addition to sitting up straight, the user's feet should be flat on the floor, elbows should be close to the body, and forearms should be substantially parallel to the floor. More importantly, the user's wrists should not be bent, and the user's hands should be in a straight line with his or her forearms. Also, the palms of the user's hands should rest on a soft surface to avoid pressure to the user's shoulders.

II. Description of the Prior Art

A standard keyboard used for a computer or typewriter is generally elongated. The depth of a standard keyboard is much less than the length, but has enough depth to provide a number of rows of alphanumeric keys and a space bar positioned below the lowermost row. The particular dimensions of a standard keyboard may vary since additional keys, such as function keys, cursor control keys and numeric keypad keys, may cause an increase in the length and/or depth of the keyboard. The height of a standard keyboard varies but conventional keyboards are commonly flat.

The flat design requires the hands and wrists to be held at an unnatural position. The natural position of a user's hands is in alignment with his or her forearms so that the user's wrists are not bent, and the user's fingers are arched slightly forward. In order to access the majority of keys of a conventional keyboard, the user must keep his or her hands parallel to the surface of the keyboard. In doing so, the wrists of a user are often bent or cocked back and upward thereby causing muscle strain through the forearms, wrists and hands. By such cocking of his or her wrists, the muscles, tendons and nerves that run through the wrist are compressed or pinched, thereby causing fatigue and strain for the user's hands.

There have been attempts to redesign keyboards to allow users a more natural wrist and hand positions during typing. One design is a planar keyboard having an arcuate shape within a particular horizontal plane so that the middle portion of the is keyboard is closer to the user's body than the end portions. To use the keyboard, the user's hands angle inward toward the keyboard instead of linearly in front of the user's body as in a conventional keyboard. The user's elbows are separated away from the body, and the hands are more directly in-line with the forearms.

Such a design is shown, for example, in U.S. Design Pat. No. Des. 338,665 to R. W. Riley, et al. titled COMPUTER KEYBOARD and U.S. Design Pat. No. Des. 348,453 to R. W. Riley, et al. titled KEYBOARD WITH WRIST PAD. Each patent provides an adjustable keyboard having a planar arcuate shape that may be changed to different radii of curvature within a horizontal plane. Thus, the keyboard is adjusted about a vertical axis to curve the ends of the keyboard away from the user. Similarly, U.S. Pat. No. 5,073,050 to S. Andrews titled ERGONOMIC KEYBOARD APPARATUS provides a keyboard having a planar arcuate shape that is adjustable within a horizontal plane to a different radii of curvature. In contrast to the two Riley patents, the keyboard ends are adjusted toward the user instead of away from the user.

A problem with the above planar arcuate keyboard is that the top surface of the keyboard is flat. Thus, like a conventional keyboard, the flat design of a planar arcuate keyboard requires the hands to be held at an unnatural position. Specifically, the user must keep his or her hands parallel to the surface of the keyboard when typing. Therefore, the user must cock his or her wrists and hands thereby experiencing muscle strain through the forearms, wrists and hands.

Non-flat or elevationally curved keyboards are also known. Such keyboards are described in U.S. Pat. Nos. 5,029,260 and 5,120,938, both to S. H. Rollason and titled KEYBOARD HAVING CONVEX CURVED SURFACE. Each keyboard has a uniform elevational curve to all rows of keys such that the middle portion is substantially horizontal, whereas the end portions are directed downward and away from the middle portion. To use the keyboard, the user's hands are substantially horizontal when typing at the middle portion but are substantially vertical when typing at the end portions.

Other ergonomic keyboards have unique curvatures and arrangements that attempt to provide the user with a comfortable typing position. For example, U.S. Pat. No. 4,597,681 to A. N. Hodges titled ADJUSTABLE KEYBOARD provides a keyboard having two sections that may be adjusted relative to each other. Each keyboard section has a concave arrangement of keys that curve toward the user. Also, U.S. Pat. No. 5,397,189 to R. F. Minogue titled NON-PLANAR ERGONOMIC KEYBOARD provides an arcuate keyboard having keys that slope toward the center of the keyboard. Also, the central keys are raised from the general horizontal plane of the keyboard to bring them closer to the user.

Similar to the planar arcuate keyboards, the elevationally curved keyboards and other ergonomic keyboards still require the hands to be held at an unnatural position. As stated above, the natural position of the user's hands is to be in alignment with the forearms with the fingers arched slightly forward. None of the above keyboards provide a typing surface that so complements naturally to a user's hands so that the user's hands and wrists are at a relaxed position thereby avoiding RSI.

The present invention is a keyboard having an arcuate top surface that is curved about a horizontal axis extending through the entire length of the keyboard, much like an upper section of an elongated cylinder. All keys in a particular row are positioned at the same elevational level, and each row is positioned at a different elevational level. When using the present invention, the user does not bend his or her wrists. The elbows are close to the body as suggested by physical therapists, orthopedic surgeons and ergonomics experts. The user's arms may be substantially straight to keep the elbows close to the body while typing comfortably at the keyboard. In addition, the user may arch his or her fingers forward at their natural position over the top surface of the keyboard.

SUMMARY OF THE INVENTION

Against the foregoing background, it is a primary object of the present invention to provide a curved keyboard having arcuately arranged keys to form an arcuate surface that complements naturally to a user's wrists, hands and fingers.

It is another object of the present invention to provide such a curved keyboard in which the user does not bend his or her wrists while keeping the elbows close to the user's body.

It is a further object of the present invention to provide such a curved keyboard in which the user may extend his or her arms toward the keyboard, with the arms being substantially straight, while typing comfortably at the keyboard.

It is still a further object of the present invention to provide such a curved keyboard in which the user arches his or her fingers forward at their natural position over the top surface of the keyboard.

It is still another object of the present invention to provide such an arcuate keyboard that may be tilted or otherwise adjusted to a comfortable typing position for the user.

It is yet another object of the present invention to provide such an arcuate keyboard that rotates about a longitudinal axis to adjust to the user's wrists and avoid angulation of the wrists.

It is yet a further object of the present invention to provide such an arcuate keyboard that includes a soft-padded surface for resting the user's lower palms to avoid shoulder stress.

To accomplish the foregoing objects and advantages, the present invention is a curved keyboard which, in brief summary, comprises an elongated base having an upper surface and a plurality of keys positioned at the upper surface of the base. The base has a longitudinal axis disposed below the upper surface, and the upper surface is curved about the longitudinal axis. The plurality of keys are arranged about the longitudinal axis to form an arcuate typing surface.

More expansively, the present invention is a keyboard station for supporting a curved keyboard, such as a computer or typewriter workstation, which comprises a supporting structure having a front side and an adjustable bracket disposed on the supporting structure. The adjustable bracket extends from the front side of the supporting structure and supports the curved keyboard. The keyboard comprises an elongated base having an upper surface and a plurality of keys positioned at the upper surface. The base has a longitudinal axis disposed below the upper surface, and is supported by the adjustable bracket for pivotal adjustment about the longitudinal axis.

BRIEF DESCRIPTION OF THE DRAWINGS

The foregoing and still further objects and advantages of the present invention will be more apparent from the following detailed explanation of the preferred embodiments of the invention in connection with the accompanying drawings.

DETAILED DESCRIPTION OF THE PREFERRED EMBODIMENT

Figure 1:
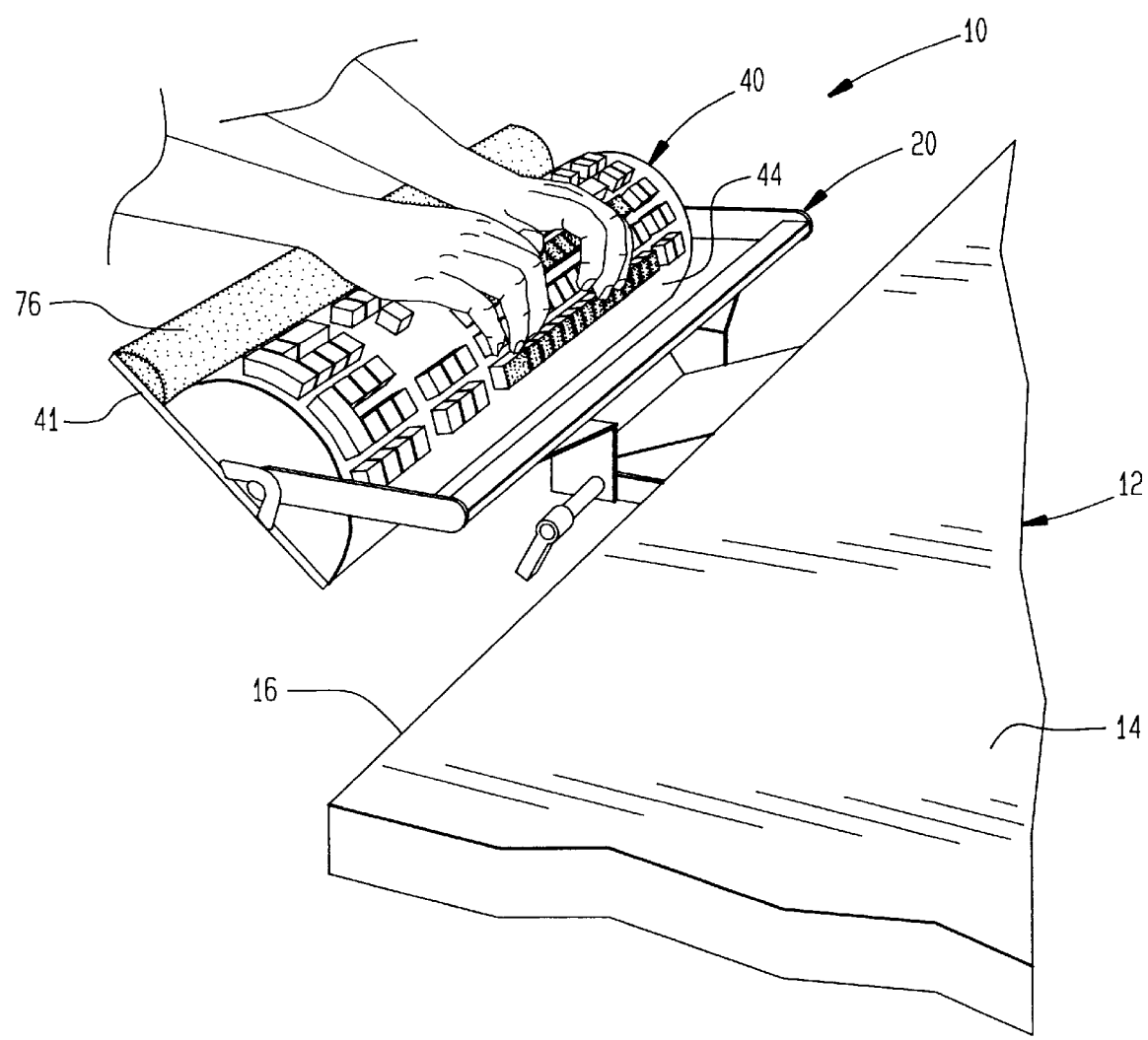
FIG. 1 is a perspective view of the preferred embodiment of the keyboard of the present invention in which the keyboard extends from the front edge of a desk and a user's hands are positioned above the keyboard.

Referring to the drawings and, in particular, to FIG. 1, there is provided a keyboard workstation of the preferred embodiment which is generally represented by reference numeral 10. The keyboard workstation 10 comprises a supporting structure 12, an adjustable bracket 20 and an adjustable, curved keyboard 40. For the preferred embodiment shown in FIG. 1, the supporting structure 12 is a desk that supports one end of the adjustable bracket 20 from underneath its desktop 14.

Referring to FIG. 1, the adjustable, curved keyboard 40 has a flange 41 formed at the front edge of the keyboard's upper surface 44. The flange 41 is adapted to position a soft element or palm rest 76, such as a foam pad.

The keyboard 40 of the preferred embodiment extends from the front side 16 of the desk or supporting structure 12 and, thus, is positioned near the user's knees when the user is sitting. Preferably, the keyboard 40 is placed at or below the user's waistline, thereby permitting the user to extend his or her arms naturally for a relaxed posture. This keyboard position is often used by an experienced user, namely a touch typist, who types without viewing the keyboard 40. With the keyboard 40 at this position, the user may extend his or her arms toward the keyboard and keep his or her elbows close to the body. Accordingly, the user keeps both arms substantially straight without bending his or her wrists to type comfortably at the keyboard 40.

The natural position of a user's hands align with his or her forearms so that the wrists are not bent and the fingers are arched slightly forward. In addition to being curved, the preferred keyboard's position also conforms to the natural position of the user's hands. For example, as shown in FIG. 1, the preferred adjustable, curved keyboard 40 is directed toward the front side 16 of the supporting structure 12, unlike conventional keyboards that face directly upward. The angled position of the preferred keyboard 40 forces the user's arms to be stretched over the keyboard so that the palms of the hands are directed toward the seat of his or her chair and rest comfortably on the soft element or palm rest 76 placed on the flange 41 of the keyboard. Thus, the user's hands are in a comfortable, natural position.

Figure 2:
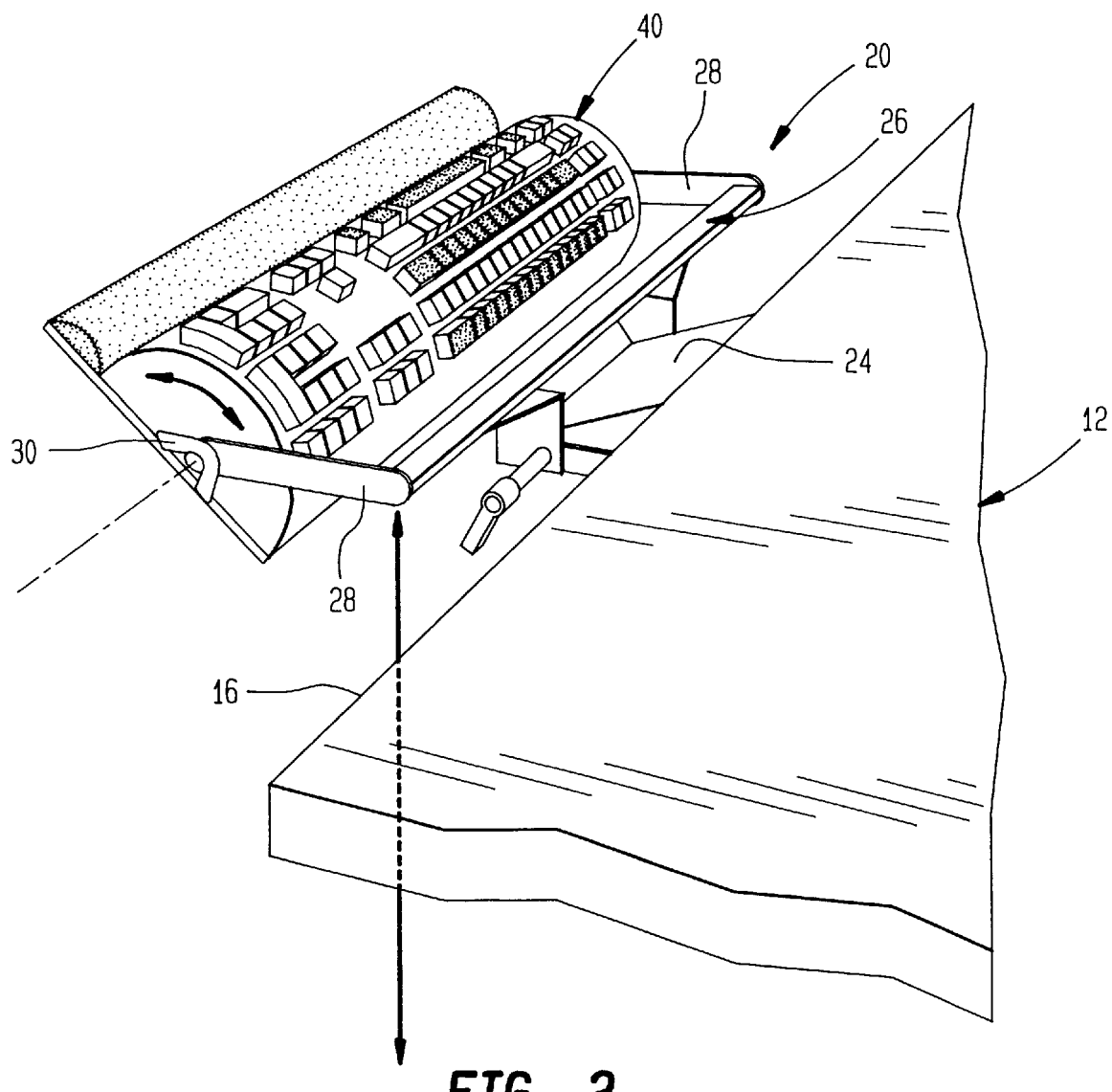
FIG. 2 is a perspective view of the keyboard of FIG. 1 that illustrates, by example, the keyboard's ability to adjust to a user's comfortable position.

Referring to FIG. 2, the adjustable, curved keyboard 40 of the present invention may be adapted to a wide variety of different shelves or brackets 20 that tuck away under the supporting structure 12. Preferably, the shelves or brackets 20 should be able to adjust the elevation, shift the horizontal position, and rotate or tilt the angle of the keyboard 40 similar to the preferred embodiment shown in FIG. 2.

The adjustable bracket 20 of the preferred embodiment includes a slidable mounting brace 22 (shown in FIGS. 3, 4 and 5) that permits the bracket to slide back and forth from the front side 16 of the supporting structure 12, similar to a desk drawer. The adjustable bracket 20 also includes a pivotal arm 24 having one end coupled to the mounting brace 22 and a U-shaped keyboard holder 26 coupled to the other end of the pivotal arm. The U-shaped keyboard holder 26 includes a pair of extending bars 28 that support opposite ends of the keyboard 40. By supporting the keyboard 40 at its ends, the keyboard can be rotated or tilted at an angle that is comfortable for the user. The pivotal arm 24 provides for vertical or elevational positioning of the U-shaped keyboard holder 26 and, thus, the keyboard 40. In addition, the adjustable bracket 20 includes tightening screws 30, 32 (shown in FIGS. 2, 3 and 4) for the pivotal arm 24 and the U-shaped keyboard holder 26 to maintain them at a user's desired position once such position is determined and set.

Figure 3:
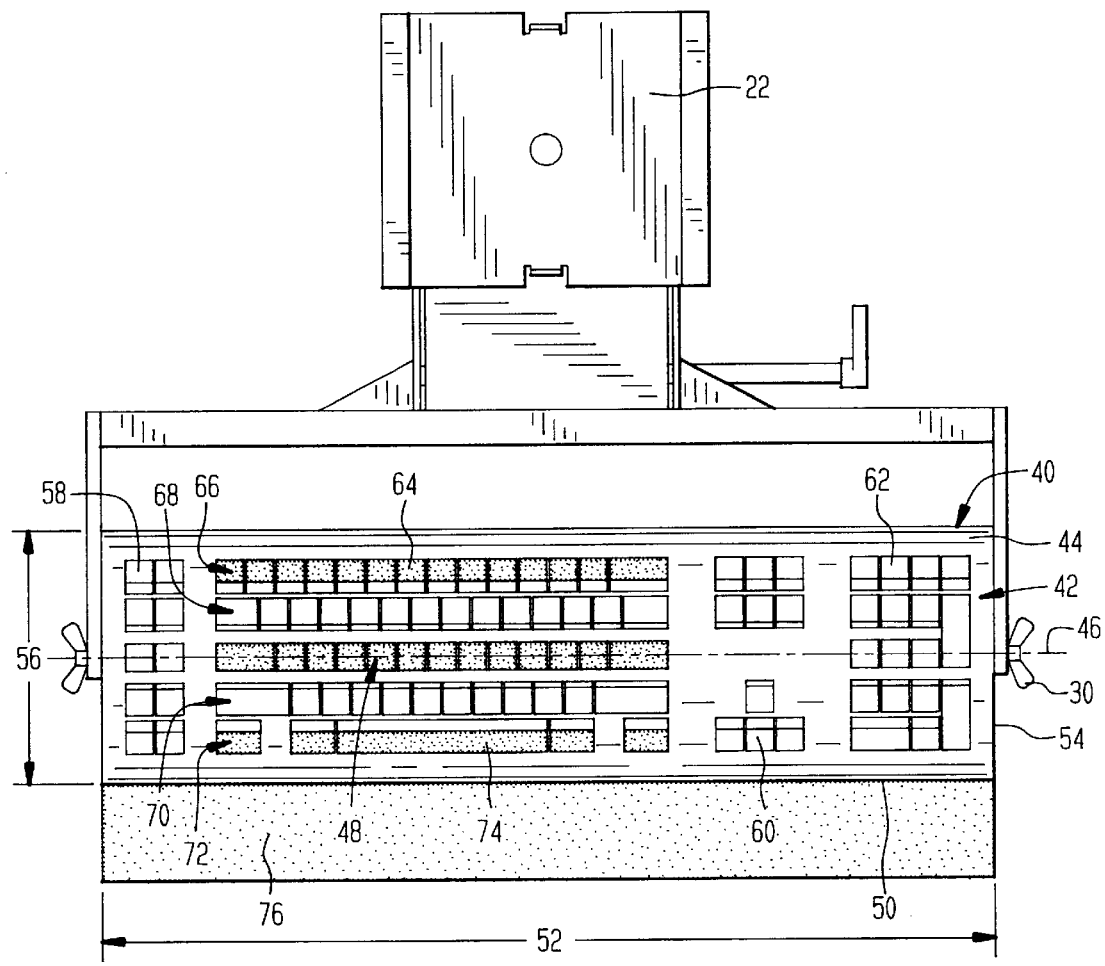
FIG. 3 is a top view of the keyboard of FIG. 1.
Figure 4:
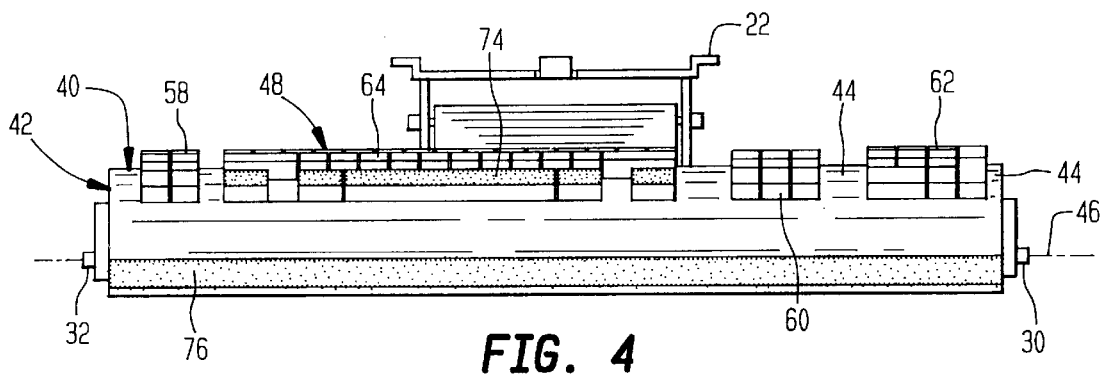
FIG. 4 is a front view of the keyboard of FIG. 1.

Referring to FIGS. 3 and 4, the keyboard 40 includes an elongated base 42 having an upper surface 44 and a longitudinal axis 46 disposed below the upper surface. The upper surface 44 is curved about the longitudinal axis 46, and a plurality of keys positioned at the upper surface. Thus, similar to the upper surface 44, the keys are arranged about the longitudinal axis 46 to form an arcuate typing surface 48 that provides a relaxed and comfortable typing position for the user's hands and wrists without causing repetitive stress.

The upper surface 44 of the elongated base 42 has a first side 50 corresponding to the length 52 of the base, and a second side 54 corresponding to the depth 56 of the base. As shown in FIGS. 3 and 4, the length 52 of the elongated base 42 is greater than the depth 56 and the longitudinal axis 46 is substantially parallel to the length.

Additional keys, such as the function keys 58, cursor control keys 60 and numeric keypad keys 62, may be located to either side of the alphanumeric keys 64 of the adjustable, curved keyboard 40. For example, as shown in FIG. 1, the function keys 58 are positioned to the left of the alphanumeric keys 64 and the cursor control 60 and numeric keypad keys 62 are positioned to the right of the alphanumeric keys. Although other keys may be located above the alphanumeric keys 64, this key position would be too remote from the user's reach to benefit from the ergonomic design of the keyboard 40 of the present invention.

The alphanumeric keys 64 include four rows of keys 66, 68, 70 and 72, and a space bar 74 positioned beneath the lowermost row of keys. For the preferred embodiment shown in FIGS. 3 and 4, every other row has a different texture, such as a rough surface, that provides feedback and re-assurance to the user that his or her hands are positioned correctly on the keyboard 40. For example, as shown in FIG. 1, the keys in the central key row, i.e. "ASDFGHJKL;'", have a rough surface that is similar to a ine grid sandpaper.

As shown in FIGS. 3 and 4, a built-in palm rest 76 is provided adjacently below the space bar 74 of the adjustable, curved keyboard 40. This palm rest 76 is used to rest the thenar and hypathenar of the user's palms, thereby avoiding or minimizing stress to a user's shoulders. Avoidance of such shoulder stress has been found to avoid user headaches as well.

Figure 5:
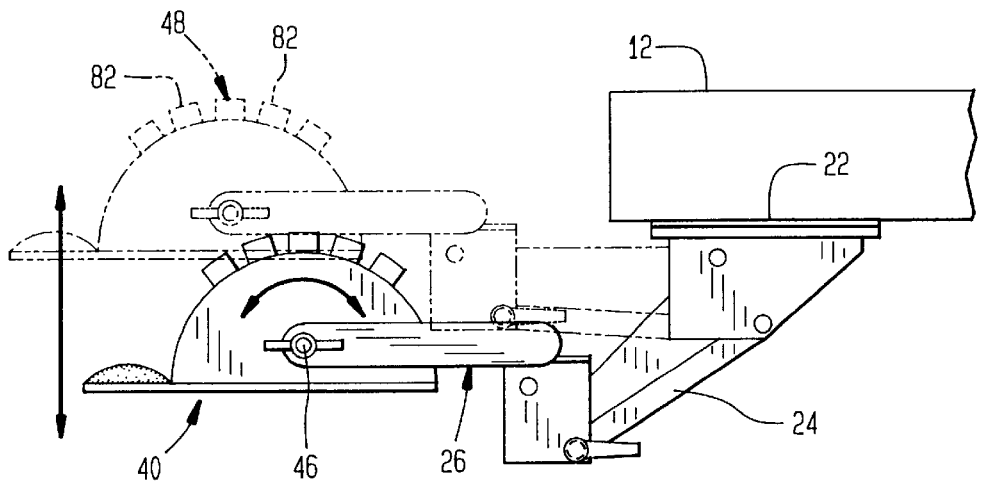
FIG. 5 is a side elevational view of the keyboard of FIG. 1.

Referring to FIG. 5, the arcuate typing surface 48 may be based on a wide variety of different curvatures that are natural to the user's hands. As shown in FIG. 5, each key of the adjustable, curved keyboard 40, preferably, is an arcuate key is having an arcuate key surface 82 that has a convex form and curves about the longitudinal axis 46. In addition, the keys reside on a circuit board (not shown) disposed in the keyboard 40 that, preferably, has an arcuate or multi-angular form. Preferably, both the arcuate key surfaces 82 and the circuit board have curvatures that follow the general curvature of the keyboard 40. The radius of the keyboard 40, arcuate key surfaces 82 and/or circuit board can vary to suit the size of the user's hands for the present invention. It is preferred that the arcuate typing surface 48 of the keyboard 40 and arcuate key surfaces 82 have a symmetrical curve about the longitudinal axis 46, thus providing certain desirable cross-sections, such as a semi-circular cross-section, an semi-elliptical cross-section and a semi-parabolic cross-section.

For the arcuate typing surface 48 having a semi-circular cross-section, the arcuate typing surface would have a particular radius of curvature. The general equation for a circle having a center at $(X_0, Y_0)$ is:

$$(X-X_0)^2 + (Y-Y_0)^2 = r^2 \qquad (1)$$

in which r is the radius of the circle or, in the case of the present invention, the radius of curvature. Preferably, the arch length of the adjustable, curved keyboard 40 is about 5 inches. Therefore, the particular radius of curvature is preferably about 2 inches to about 10 inches and, more preferably, the particular radius of curvature is about 2½ inches and a curvature angle of about 90 degrees.

For the arcuate typing surface 48 having an semi-elliptical or semi-parabolic cross-section, the radius of curvature varies throughout its curvature. Accordingly, such semi-elliptical and semi-parabolic cross-sections are more accurately described as having a symmetrical curve about the longitudinal axis 46. The general equation for an ellipse having a center at $(X_0, Y_0)$ is:

$$\frac{(X-X_0)^2}{a^2} + \frac{(Y-Y_0)^2}{b^2} = 1 \qquad (2)$$

in which a and b are semiaxes of the ellipse.

Likewise, the general equation for a parabola having a center at $(X_0, Y_0)$ is:

$$(Y-Y_0)^2 = 4a(X-X_0) \qquad (3)$$

in which a is a semiaxis of the parabola.

Figure 6:
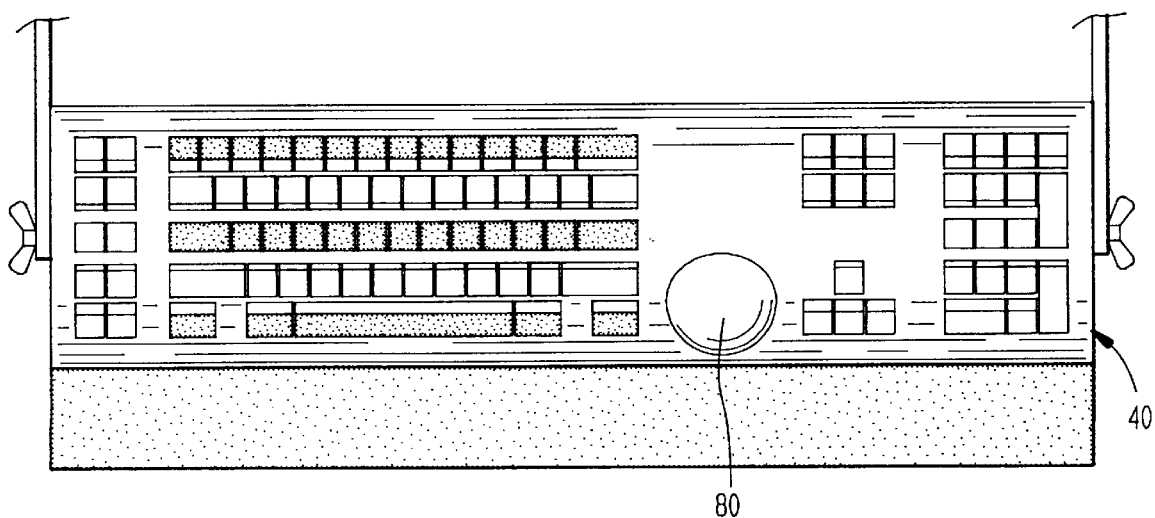
FIG. 6 is an alternative embodiment of the curved adjustable keyboard of the present invention having a trackball assembly positioned in the middle of the keyboard.
Figure 7:
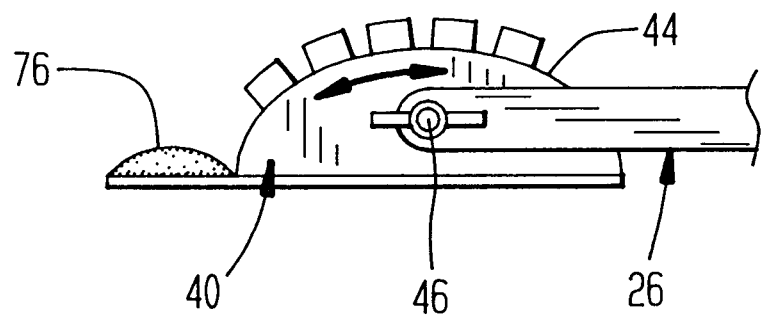
FIG. 7 is a perspective view of an alternative keyboard of the present invention having a semi-elliptical typing surface.
Figure 8:
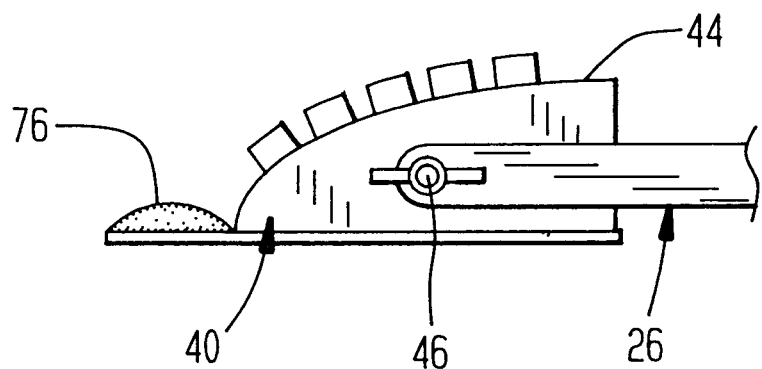
FIG. 8 is a perspective view of an alternative keyboard of the present invention having a semi-parabolic typing surface.

Referring to FIG. 6, there is shown an alternative embodiment of the curved keyboard 40 of the present invention. In particular, the alternative embodiment includes a trackball assembly 80 in the middle of the keyboard 40. Alternatively, the trackball assembly may 40 be placed to either end portion of the keyboard 40.

The curved keyboard of the present invention may be designed to have different arches and is not limited to a single arch. In fact, it is contemplated that a keyboard having an adjustable, varying arch may be used. It is also contemplated that the keyboard 40 may automatically rotate throughout the day to continually change the angle at which the user uses the keyboard.

Further, it is to be understood that, unless otherwise stated above, the standard conventions and arrangements of the keyboard of the present invention are similar to that of a standard keyboard.

The present invention having been thus described with particular reference to the preferred forms thereof, it will be obvious that various changes and modifications may be made therein without departing from the spirit and scope of the invention as defined in the appended claims.

What is claimed is:

1. An adjustable curved keyboard assembly comprising:
    a curved keyboard including an elongated base having a longitudinal axis and an upper surface disposed above said axis, said upper surface forming a convex curve about said longitudinal axis, said upper surface having a first side corresponding to a keyboard length and a second side corresponding to a keyboard depth, wherein said first side is longer than said second side and said longitudinal axis is substantially parallel to said first side;
    a plurality of rows of keys positioned on said upper surface and about said longitudinal axis, each of said plurality of rows of keys being substantially parallel to said longitudinal axis, each key of said plurality of rows of keys including an arcuate upper surface, wherein the arcuate upper surface of each key of said plurality of rows of keys are curved about said longitudinal axis to form a convex typing surface; and
    an adjustable bracket for supporting said base, said bracket being adapted to pivot said keyboard to a position in which said base slants away from a user.

2. The adjustable keyboard assembly of claim 1 wherein said adjustable bracket is adjustable in elevation and horizontal position relative to a user's lap.

3. The curved keyboard assembly of claim 1, wherein said convex typing surface has a radius of curvature.

4. The curved keyboard assembly of claim 3, wherein said radius of curvature is from about 2 inches to about 10 inches.

5. The curved assembly keyboard of claim 4, wherein said radius of curvature is about 2½ inches.

6. The curved keyboard assembly of claim 3, wherein said convex typing surface has a semi-circular cross-section.

7. The curved keyboard assembly of claim 1, wherein said convex typing surface is symmetrically curved about said longitudinal axis.

8. The curved keyboard assembly of claim 1, wherein said convex typing surface has a semi-elliptical cross-section.

9. The curved keyboard assembly of claim 1, wherein said convex typing surface has a semi-parabolic cross-section.

10. The curved keyboard assembly of claim 1, wherein said convex typing surface has a curvature angle of about 90 degrees.

11. The curved keyboard assembly of claim 1, wherein:
    said plurality of keys includes a plurality of alphanumeric rows; and
    adjacent rows of said plurality of alphanumeric rows have different surface textures.

12. The curved keyboard assembly of claim 1, wherein said plurality of keys includes a plurality of alphanumeric rows and a group of function keys adjacent to one end of said plurality of alphanumeric rows.

13. An adjustable computer of typewriter curved keyboard assembly comprising:
    a curved keyboard including an elongated base having a longitudinal axis and an upper surface disposed above said axis, said upper surface forming a convex curve about said longitudinal axis, said upper surface having a first side corresponding to a keyboard length and a second side corresponding to a keyboard depth, wherein said first side is longer than said second side and said longitudinal axis is substantially parallel to said first side;
    a plurality of rows of keys positioned on said upper surface and about said longitudinal axis, each of said plurality of rows of keys being substantially parallel to said longitudinal axis; and
    an adjustable bracket for supporting said base, said bracket being adapted to pivot said keyboard to a position in which said base slants away from a user.

14. The adjustable curved keyboard assembly of claim 13, wherein said adjustable bracket is adjustable in elevation and horizontal position relative to a user's lap.

* * * * *